US011132327B2

(12) United States Patent
Tresidder et al.

(10) Patent No.: US 11,132,327 B2
(45) Date of Patent: Sep. 28, 2021

(54) METHOD AND APPARATUS FOR PHYSICAL LAYER BYPASS

(71) Applicants: Advanced Micro Devices, Inc., Santa Clara, CA (US); ATI Technologies ULC, Markham (CA)

(72) Inventors: Michael J. Tresidder, Austin, TX (US); Yanfeng Wang, Markham (CA); Shiqi Sun, Markham (CA)

(73) Assignees: ATI TECHNOLOGIES ULC, Markham (CA); ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/204,751

(22) Filed: Nov. 29, 2018

(65) Prior Publication Data

US 2020/0174962 A1 Jun. 4, 2020

(51) Int. Cl.
*G06F 13/42* (2006.01)
*G06F 13/20* (2006.01)

(52) U.S. Cl.
CPC .......... *G06F 13/4291* (2013.01); *G06F 13/20* (2013.01)

(58) Field of Classification Search
CPC .............................. G06F 13/20; G06F 13/4291
See application file for complete search history.

(56) References Cited

U.S. PATENT DOCUMENTS

| 7,079,571 B1* | 7/2006 | Chen ....................... H04L 1/243 370/247 |
| 7,394,288 B1 | 7/2008 | Agarwal |
| 8,458,383 B1* | 6/2013 | Wortman ............ G06F 13/4059 710/62 |
| 9,219,560 B2 | 12/2015 | Hummel |
| 9,647,688 B1 | 5/2017 | Poplack et al. |
| 2003/0179771 A1* | 9/2003 | Chan ....................... H04L 12/28 370/445 |
| 2013/0329558 A1 | 12/2013 | Kucharewski et al. |
| 2014/0273852 A1 | 9/2014 | McCormack et al. |
| 2016/0306763 A1* | 10/2016 | Geva ....................... G06F 13/36 |
| 2018/0167880 A1* | 6/2018 | Carty ................ H04W 52/0212 |
| 2018/0225230 A1 | 8/2018 | Litichever et al. |
| 2018/0285301 A1* | 10/2018 | Thanigasalam ..... G06F 13/4027 |
| 2019/0020466 A1* | 1/2019 | Raymond ........ H04B 10/25752 |

* cited by examiner

*Primary Examiner* — Nimesh G Patel
(74) *Attorney, Agent, or Firm* — Volpe Koenig

(57) ABSTRACT

A method and apparatus for physical layer bypass data transmission between physical coding sub-layers (PCS) includes encoding the data for transmission over a serial low-speed link. The data is transmitted from a first PCS via a serial connection over a serializer/deserializer (SERDES) transmission bypass path The data is received by a second PCS via a SERDES receive bypass path.

30 Claims, 4 Drawing Sheets

METHOD AND APPARATUS FOR PHYSICAL LAYER BYPASS

BACKGROUND

A physical link (PHY) is trained up before data can be sent between link partners. If the PHY cannot be trained up for any reason, the link will not be able to transmit or receive any data. Additionally, if a system including the PHY has a low volume of data to be sent, the system has to train up the link and turn it off afterwards, consuming time and power.

Currently, the universal serial bus (USB) sends low frequency periodic signaling (LFPS) sequences on a serial link. However, LFPS has a fixed pattern and limited usage (e.g., detect, wake up and reset link partner).

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a technique for bypassing the physical layer for transmission is disclosed herein.

A method for physical layer bypass data transmission between physical coding sub-layers (PCS) includes encoding the data for transmission over a serial low-speed link. The data is transmitted from a first PCS via a serial connection over a serializer/deserializer (SERDES) transmission bypass path. The data is received by a second PCS via a SERDES receive bypass path.

An apparatus for physical layer bypass data transmission between physical coding sub-layers (PCS) is disclosed herein. The apparatus includes a memory, an input device, an output device, and a processor operatively coupled with the memory, the input device and the output device. The input device include a first media access code (MAC) layer module, a first PCS module, and a first SERDES physical link (PHY). The output device includes a second MAC module, a second PCS module, and a second SERDES PHY. The processor encodes data for transmission over a serial low-speed link, and transmits the data from the first PCS via a serial connection over a SERDES transmission bypass path. The transmitted data is received by the second PCS via a SERDES receive bypass path.

A non-transitory computer-readable medium having instructions recorded thereon, that when executed by a computing device, cause the computing device to perform operations including encoding the data for transmission over a serial low-speed link. The data is transmitted from a first PCS via a serial connection over a serializer/deserializer (SERDES) transmission bypass path, The data is received by a second PCS via a SERDES receive bypass path.

Figure 1:
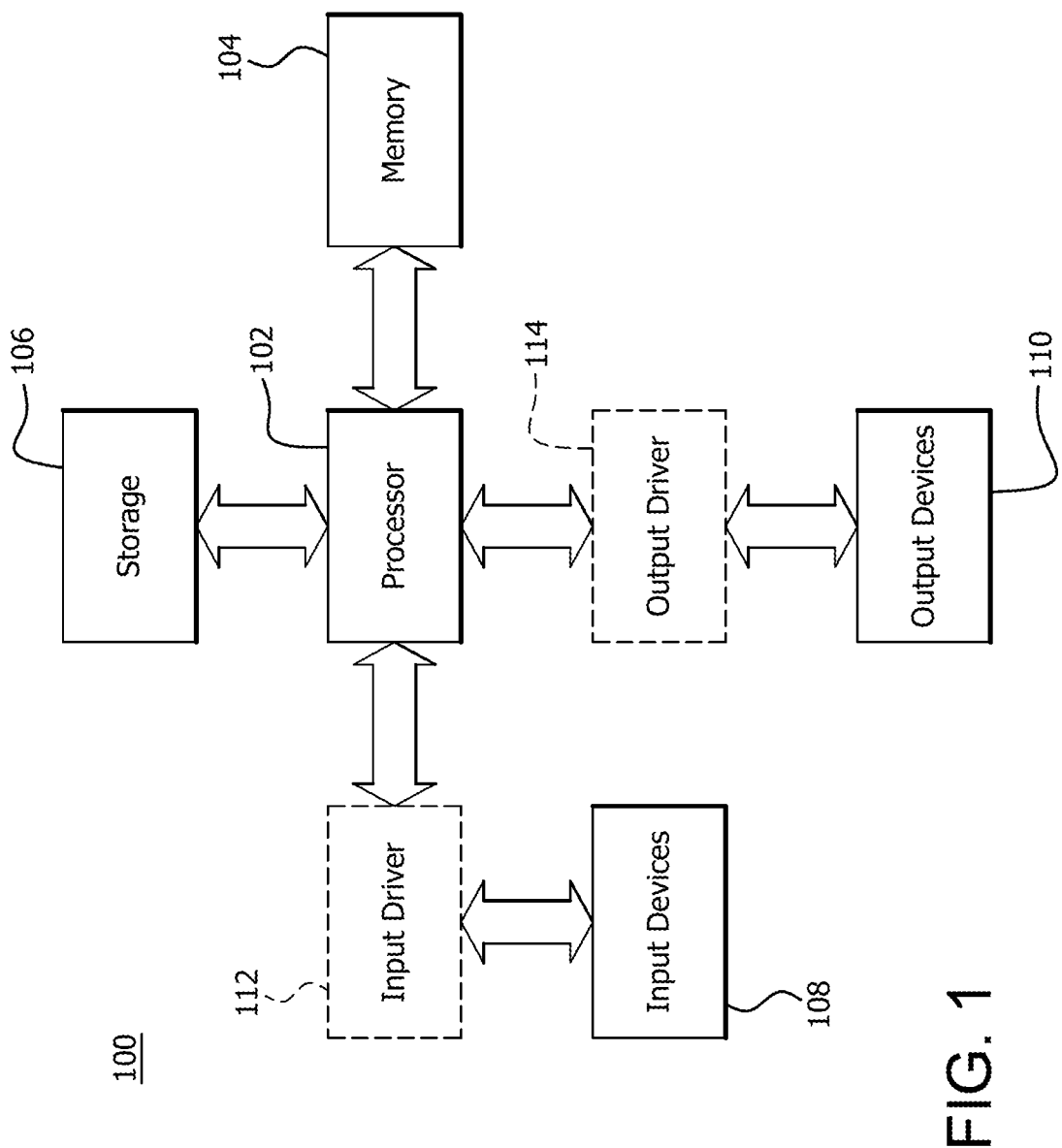
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
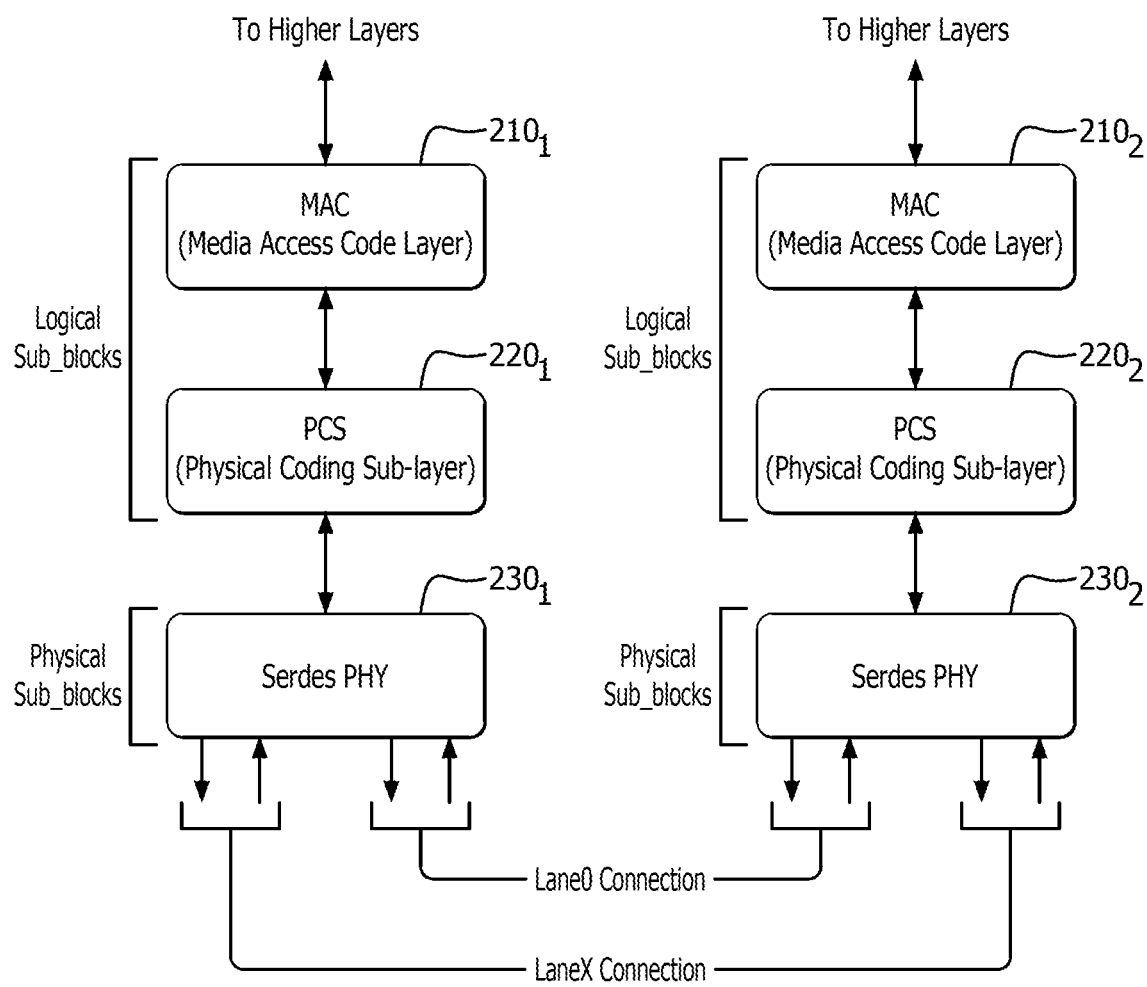
FIG. 2 is a schematic diagram of a physical and logical layer group for link transmissions, according to an example.

FIG. 2 is a schematic diagram of a physical and logical layer group 200 for link transmissions, according to an example. In FIG. 2, two groups of physical and logical layers are depicted; however, any number of groups could be utilized. Each physical and logical layer group 200 includes a media access code (MAC) layer 210 (designated $210_1$ and $210_2$), in communication with a physical coding sub-layer (PCS) 220 (designated $220_1$ and $220_2$), and a serializer/deserializer (SERDES) physical link (PHY) 230 (designated $230_1$ and $230_2$) in communication with the PCS 220. Together, the MAC layers 210 and PCS 220 form the logical sublayers and the SERDES PHY 230 forms the physical layer.

The MAC layers 210 are in communication with higher layers. The PCS layers 220 are in communication with the MAC layers 210 and SERDES PHY layers 230. The SERDES PHY layers 230 communicate with one another over a plurality of lane connections, or links (designated Lane0 ... LaneX). The higher layers include, for example, a control network, or a chip module that includes data. The components depicted in FIG. 2 may reside in the input/output devices 108/110, however they are not limited to residing in those devices.

Figure 3:
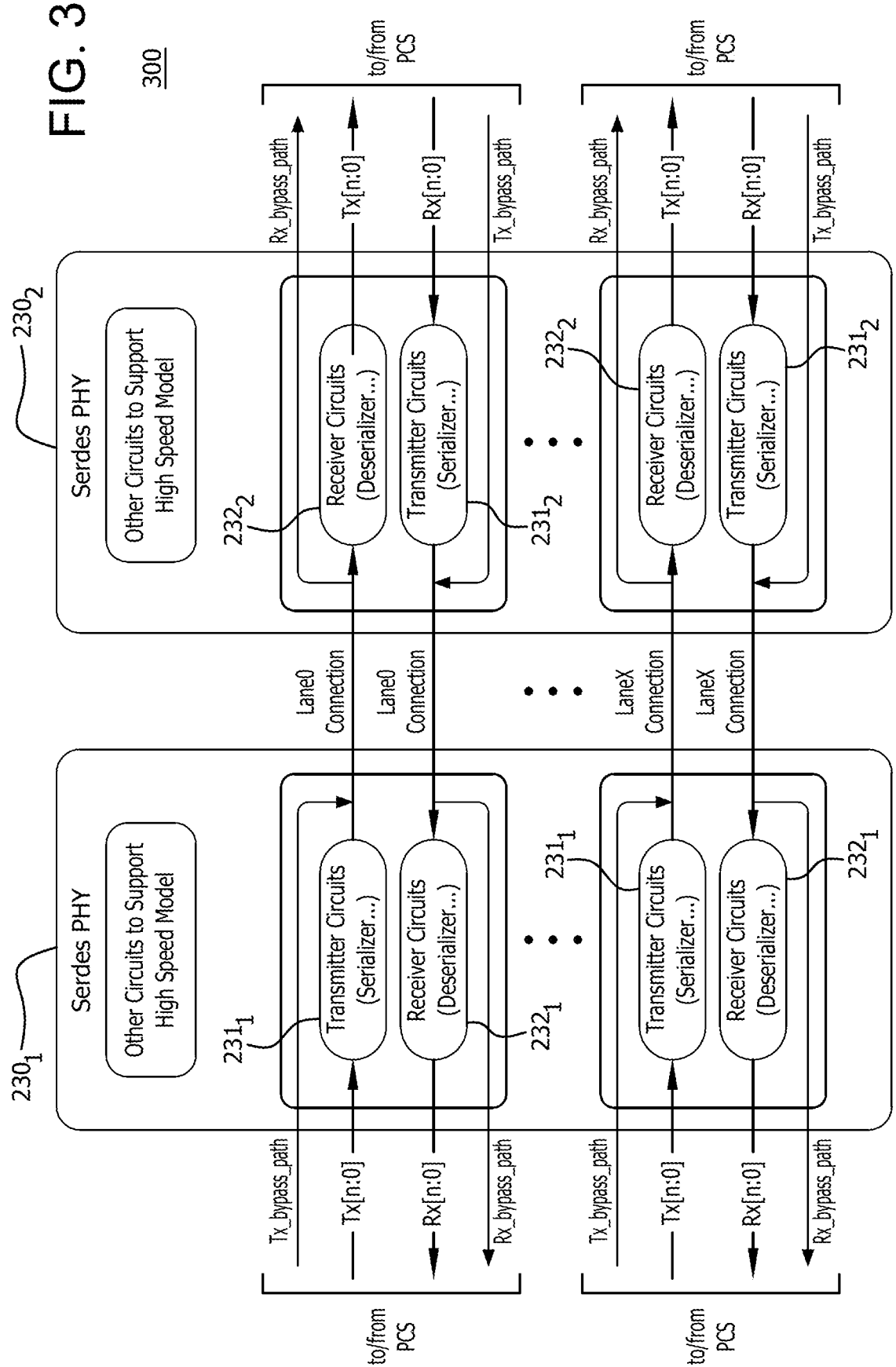
FIG. 3 is a schematic diagram of a pair of physical layer groups in communication with one another for link transmissions, according to an example.

FIG. 3 is a schematic diagram 300 of a pair of physical layer groups (SERDES PHY $230_1$ and $230_2$) in communication with one another for link transmissions, according to an example. As can be seen in FIG. 3, each SERDES PHY 230 includes transmitter circuits 231 (designated $231_1$ and $231_2$) and receiver circuits (designated $232_1$ and $232_2$) as well as other circuits to support high speed mode.

The transmitter circuits 231 receive transmissions from their respective PCS 220 for transmission to the corresponding receiver circuits 232 in the other SERDES PHY 230. For example, transmitter circuit $231_1$ receives transmissions from PCS $220_1$ and transmits them over Lane0 . . . LaneX to receiver circuits $232_2$ for forwarding to PCS $220_2$.

Additionally, a bypass path is included which bypasses both the transmitter circuits 231 and the receiver circuits 232. That is, a transmission (Tx) bypass path bypasses the transmitter circuits 231 to connect the PCS 220 to the Tx Lane0 . . . X connection to the associated receiver circuits 232. A receive (Rx) bypass path connects the Lane0 . . . X connections to the PCS 220. These Tx and Rx bypass paths bypass their respective transmitter circuits 231 and receiver circuits 232 in order to allow the general purpose input/output (GPIO) pins from one PCS 220 to transmit directly to another PCS 220 (e.g., PCS $220_1$ transmitting to and receiving from PCS $220_2$).

Accordingly, data can be transmitted without training the transmitter circuits 231 and receiver circuits 232 by utilizing the Tx and Rx bypass paths.

Figure 4:
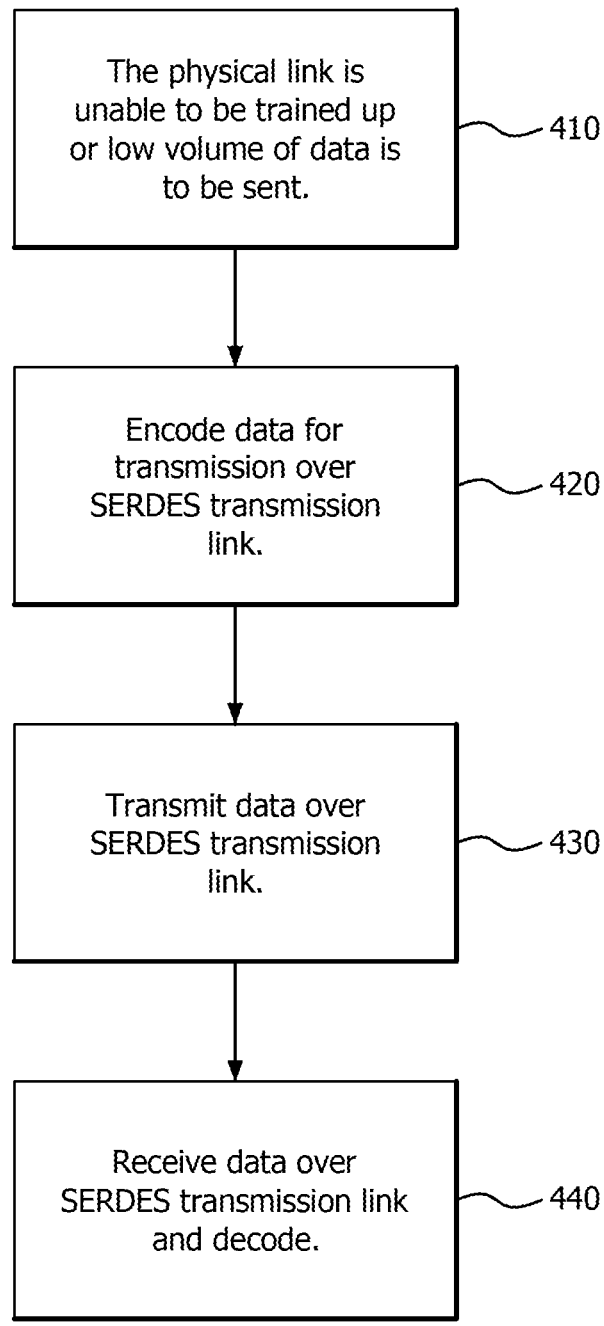
FIG. 4 is a flow diagram of an example method of bypassing the physical layer.

FIG. 4 is a flow diagram of an example method 400 of bypassing the physical layer. In step 410, the physical link (e.g., transmitter circuits 231 and receiver circuits 232 shown in FIG. 2) are unable to be powered up or the volume of data to be transmitted is low when the physical link is in power savings mode, such that the cost and energy to train (power up) the transmitter circuits 231 and receiver circuits 232 causes an alternative way of transmitting the data to be more efficient. For example, some PHY settings may not be properly set upon initialization, and therefore the PHY cannot properly lock the clock even at its lowest training speed, or the communication channel between two devices (i.e., $230_1$ and $230_2$) may have been severed. Accordingly, bypassing mode can be used to communicate between the two devices and set proper values for PHY transmission before the PHY is trained. Bypassing mode may be chosen in accordance with the following:

$$\frac{\text{data to be sent}}{\text{trained up mode link bandwidth}} + \text{link train up time} > \quad \text{(Equation 1)}$$
$$\frac{\text{data to be sent}}{\text{bypassing mode link bandwidth}} +$$
$$\text{link bypassing mode training time}$$

In accordance with the above equation, link bypassing mode training time is less than link training up time, as it skips, for example, the PHY circuit power up, calibration, and equalization processes. Additionally, bypassing mode may be selected for power savings, such as when the group 200 is sensitive to power constraints. In that case, training up the PHY circuits consumes significant power as many PHY circuits and it takes time to train up everything in the PHY, or during low speed mode for the PHY circuits.

Data monitoring can be implemented in the MAC layer or higher layer logic, based on a programmable threshold. Using the data monitoring, if the volume of data for transmission is below the programmable threshold, the link is not trained up, and bypass mode is utilized instead.

In the above case, the data to be transmitted is encoded for transmission over the SERDES transmission link via the bypass paths (step 420). For example, the data may be encoded using universal asynchronous receiver-transmitter (UART) mode encoding. However, other appropriate types of encoding may be utilized to transmit data directly from the GPIO pins of PCS 220 when bypassing the PHY circuitry.

In step 430, the data is transmitted over the SERDES transmission link. That is, data from the GPIO pins of one PCS 220 is sent at low speed over one or more of the serial Link0 . . . LinkX connections using the bypass paths. In this manner, the encoded data is transmitted directly on the GPIO pins, bypassing the SERDES and other PHY circuits.

Once received, the encoded data is received and decoded (step 440).

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

For example, although the above methods and apparatus describe the transmission of data over a SERDES bypass path, it should be noted that the methods and apparatus can be utilized to transmit any raw data (i.e., data without serialization/deserialization) from the GPIO pins of one device to another, bypassing other PHY circuits.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for physical layer bypass data transmission between physical coding sub-layers (PCS) to avoid physical layer powerup, comprising:
    based upon a link bypassing mode training time being less than a link training up time of a physical link serializer/deserializer (SERDES) transmitter and receiver for data transmission:
    encoding the data for transmission over a serial low-speed link;
    transmitting the data from a first PCS via a serial connection over a SERDES transmission bypass path without training up the link transmission circuitry; and
    receiving the data by a second PCS via a SERDES receive bypass path without training up the link receiving circuitry.

2. The method of claim 1, wherein the data is transmitted over the transmission bypass path if the physical layer is unable to be powered up.

3. The method of claim 2, wherein the physical communication link between the first PCS and the second PCS is severed.

4. The method of claim 1, wherein the data is transmitted over the transmission bypass path if a volume of data to be transmitted is lower than a threshold.

5. The method of claim 4, further comprising monitoring data volume.

6. The method of claim 1, wherein the data is transmitted over the transmission bypass path if the physical layer cannot lock a clock for timing.

7. The method of claim 1, wherein the data is transmitted over the transmission bypass path if the first PCS and the second PCS are operating in a power saving mode.

8. The method of claim 1, wherein the data is encoded utilizing universal asynchronous receiver-transmitter (UART) mode encoding.

9. The method of claim 1, wherein the data is transmitted between general purpose input/output (GPIO) pins from the first PCS to the GPIO pins of the second PCS.

10. The method of claim 1, further comprising decoding the transmitted data by the second PCS.

11. An apparatus for physical layer bypass data transmission between physical coding sub-layers (PCS) to avoid physical layer powerup, comprising:
a memory;
an input device including:
a first media access code (MAC) layer module;
a first PCS module; and
a first serializer/deserializer (SERDES) physical link (PHY);
an output device including:
a second MAC module;
a second PCS module; and
a second SERDES PHY; and
a processor operatively coupled with the memory, the input device and the output device, based upon a link bypassing mode training time being less than a link training up time of a physical link SERDES transmitter and receiver for data transmission, the processor configured to:
encode data for transmission over a serial low-speed link; and
transmit the data from the first PCS via a serial connection over a SERDES transmission bypass path without training up the link transmission circuitry,
wherein the transmitted data is received by the second PCS via a SERDES receive bypass path without training up the link receiving circuitry.

12. The apparatus of claim 11, wherein the data is transmitted over the transmission bypass path if the physical layer is unable to be powered up.

13. The apparatus of claim 12, wherein the physical communication link between the first PCS and the second PCS is severed.

14. The apparatus of claim 11, wherein the data is transmitted over the transmission bypass path if a volume of data to be transmitted is lower than a threshold.

15. The apparatus of claim 14, wherein the processor is further configured to monitor data volume.

16. The apparatus of claim 11, wherein the data is transmitted over the transmission bypass path if the physical layer cannot lock a clock for timing.

17. The apparatus of claim 11, wherein the data is transmitted over the transmission bypass path if the first PCS and the second PCS are operating in a power saving mode.

18. The apparatus of claim 11, wherein the processor is configured to encode the data utilizing universal asynchronous receiver-transmitter (UART) mode encoding.

19. The apparatus of claim 11, wherein the data is transmitted between general purpose input/output (GPIO) pins from the first PCS to the GPIO pins of the second PCS.

20. The apparatus of claim 11, wherein the processor is further configured to decode the received data by the second PCS.

21. A non-transitory computer-readable medium having instructions recorded thereon, that when executed by a computing device, cause the computing device to perform operations including:
based upon a link bypassing mode training time being less than a link training up time of a physical link serializer/deserializer (SERDES) transmitter and receiver for data transmission:
encoding the data for transmission over a serial low-speed link;
transmitting the data from a first PCS via a serial connection over a SERDES transmission bypass path without training up the link transmission circuitry; and
receiving the data by a second PCS via a SERDES receive bypass path without training up the link receiving circuitry.

22. The non-transitory computer-readable medium of claim 21, wherein the data is transmitted over the transmission bypass path if the physical layer is unable to be powered up.

23. The non-transitory computer-readable medium of claim 22, wherein the physical communication link between the first PCS and the second PCS is severed.

24. The non-transitory computer-readable medium of claim 21, wherein the data is transmitted over the transmission bypass path if a volume of data to be transmitted is lower than a threshold.

25. The non-transitory computer-readable medium of claim 24, further comprising monitoring data volume.

26. The non-transitory computer-readable medium of claim 21, wherein the data is transmitted over the transmission bypass path if the physical layer cannot lock a clock for timing.

27. The non-transitory computer-readable medium of claim 21, wherein the data is transmitted over the transmission bypass path if the first PCS and the second PCS are operating in a power saving mode.

28. The non-transitory computer-readable medium of claim 21, wherein the data is encoded utilizing universal asynchronous receiver-transmitter (UART) mode encoding.

29. The non-transitory computer-readable medium of claim 21, wherein the data is transmitted between general purpose input/output (GPIO) pins from the first PCS to the GPIO pins of the second PCS.

30. The non-transitory computer-readable medium of claim 21, further comprising decoding the transmitted data by the second PCS.

* * * * *